Dec. 6, 1966  K. DAUNER  3,289,269
METHOD OF PRODUCING AN ELECTRICAL CAPACITOR
Filed May 7, 1963
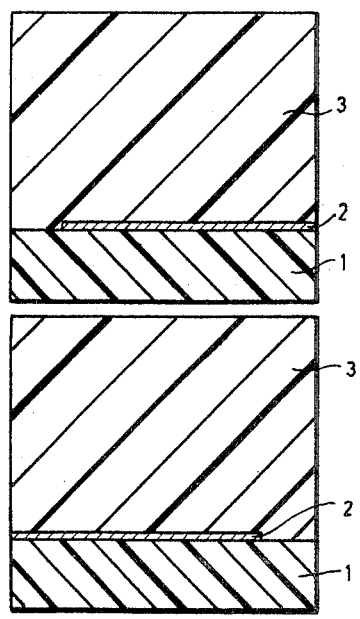
INVENTOR
KARL DAUNER
BY  ATTORNEYS United States Patent Office 3,289,269
Patented Dec. 6, 1966

3,289,269
METHOD OF PRODUCING AN ELECTRICAL CAPACITOR
Karl Dauner, Munich, Germany, assignor to Siemens & Halske Aktiengesellschaft, Berlin and Munich, Germany, a corporation of Germany
Filed May 7, 1963, Ser. No. 278,789
Claims priority, application Germany, May 10, 1962, S 79.376
5 Claims. (Cl. 29—25.42)

The invention disclosed herein is concerned with an improvement on the method described in copending application Serial No. 86,518, filed February 11, 1961, which is owned by the assignee named in the present case.

The copending application describes a method of producing an electrical capacitor having a dielectric formed of a thin band, preferably less than 6 microns thick, provided with a thin regenerative coating, comprising, placing upon a suitable auxiliary carrier or supporting foil, a first varnish layer, vaporizing on such varnish layer a metal layer while leaving a marginal strip free of metal, providing upon said metal layer a second varnish layer of a thickness which is greater and preferably considerably greater than that of the first varnish layer, removing from the auxiliary carrier foil the three-layer foil thus formed, which comprises two varnish layers and one metal layer, and forming a capacitor from at least two such three-layer foils with mutually transposed metal layers.

The copending application thus proposes to produce a thin-foil capacitor with greater breakdown strength and improved regenerative properties, by providing only a part of the dielectric on the carrier foil and the other part thereof on the metal coating, and not, as was customary until now, providing the entire dielectric (varnish) on the support foil and thereafter placing on the single relatively thick dielectric the metal coating. The advantage gained by the method according to the copending application resides in that the second dielectric layer (second varnish layer) is free of peaks, thus forming a dielectric with great breakdown strength.

The object of the present invention is to further improve the capacitor formed in the above indicated manner, especially as to its dielectric properties and the loss factor thereof, without adversely affecting the regenerative properties thereof.

According to the invention, this object is realized by using for the first varnish layer a material with good regenerative properties, while using for the second varnish layer a material with good dielectric properties.

It must be considered in this connection that, as is known, materials with particularly good dielectric properties, for example, polystyrol, often have very poor regenerative properties. Such materials decompose into conductive components, incident to self-healing breakdowns, thereby deteriorating the properties of a capacitor. This is particularly the case when the dielectric of a regenerative capacitor is solely made of polystyrol.

It was found particularly advantageous to make the first layer of acetylcellulose, because of the favorable effect of such material on the regenerative properties of the capacitor and because it is very well adapted for the production of thin-foil capacitors. The second layer may preferably be formed of polystyrol on account of the excellent dielectric properties thereof. The metal coating is appropriately produced by vaporization of a valve metal, preferably aluminum.

The invention will now be explained with reference to the accompanying drawing.

The drawing shows, on a very greatly enlarged scale, two three-layer foils, one above the other, each comprising a first varnish layer 1 made of a material with good regenerative properties, for example, acetylcellulose, upon which is vaporized a metal coating or layer 2, for example, aluminum, and a second varnish layer 3, provided on the metal coating 2, made of a material having particularly good dielectric properties, for example, polystyrol.

In an embodiment of the invention, a first varnish layer of acetylcellulose, about $1\mu$ thick, was provided on a suitable supporting band, an aluminum layer was vaporized on the first varnish layer, and a varnish layer of polystyrol, about $3\mu$ thick was provided on the metal layer. Capacitors formed by wrapping two such three-layer foils, removed from the supporting foil, had an insulation resistance amounting to more than 100,000 M$\Omega$ $\mu$f., while the loss factor at 800 cycles amounted to about $1.10^{-3}$. The electrical values remained in voltage stress tests constant up to 800 volts.

Changes may be made within the scope and spirit of the appended claims which define what is believed to be new and desired to have protected by Letters Patent.

I claim:
1. A method of producing an electrical capacitor, with regenerative characteristics, having a dielectric formed by a band with a thickness of less than 6 microns, provided with a thin regenerative coating, comprising, placing upon a suitable auxiliary support a first varnish layer made of a material with relatively good regenerative properties and relatively poor dielectric properties, vaporizing upon said first varnish layer a metal coating while leaving a marginal strip thereof free of metal, placing upon said metal coating a second varnish layer which is thicker, preferably considerably thicker, than the first layer and made of a material having relatively good dielectric properties and relatively poor regenerative properties, thus forming upon said auxiliary support a three-layer foil having two varnish layers and one metal coating, removing said three-layer foil from the auxiliary support, and forming a capacitor from at least two such three-layer foils which are assembled with the metal coatings mutually displaced.

2. The method according to claim 1, wherein said first varnish layer is formed of acetylcellulose.

3. A method according to claim 1, wherein said second varnish layer is formed of polystyrol.

4. A method according to claim 1, wherein said first varnish layer is formed of acetylcellulose and the second varnish layer of polystyrol.

5. A method according to claim 4, wherein said metal coating is an aluminum coating.

No references cited.

RICHARD H. EANES, JR., *Primary Examiner.*